United States Patent [19]

Allen et al.

[11] Patent Number: 4,923,288

[45] Date of Patent: May 8, 1990

[54] OPTICAL MODULATORS BASED ON POLYMERS

[75] Inventors: Philip C. Allen, Feltham; Jeremy H. Burroughes; Richard H. Friend, both of Cambridge; Alan J. Harrison, Woking, all of England

[73] Assignee: The British Petroleum Company p.l.c., London, England

[21] Appl. No.: 196,409

[22] Filed: May 20, 1988

[30] Foreign Application Priority Data

May 21, 1987 [GB] United Kingdom ............... 8712057

[51] Int. Cl.[5] .................................. G02F 1/17
[52] U.S. Cl. .................................. 350/355; 350/356; 357/8
[58] Field of Search .............. 350/353, 355, 356; 357/8, 4, 65

[56] References Cited

U.S. PATENT DOCUMENTS

| | | | |
|---|---|---|---|
| 4,204,216 | 5/1980 | Heeger et al. | 357/8 |
| 4,431,263 | 2/1984 | Garito | 350/96.34 |
| 4,737,020 | 4/1988 | Parker | 350/351 |
| 4,761,677 | 8/1988 | Sasaki | 357/8 |

FOREIGN PATENT DOCUMENTS 0080329 6/1983 European Pat. Off. .
8504985 11/1985 PCT Int'l Appl. .
2108757 5/1983 United Kingdom .

OTHER PUBLICATIONS

Bloor, "Electronic Processes in Extended Conjugated Polymer Chains", *Synthetic Metals*, 21 (1987), pp. 71–77.
Theocharis et al., "Structure of a Piped Diacetylene that is Polymerisable in the Solid State", *J. Chem. Soc. Chem. Commun.*, Jun. 1985, pp. 1334–1336.

Primary Examiner—Eugene R. LaRoche
Assistant Examiner—Nathan McCutcheon
Attorney, Agent, or Firm—Larry W. Evans; Joseph G. Curatolo

[57] ABSTRACT

This invention relates to a device for electrooptic modulation of an optical beam. The device is a laminate comprising a coherent film of a conjugated polymer having semi-conducting properties as the active component laminated with two or more layers of electrically conducting, insulating or semi-conducting materials. At least the active component in the laminate is capable of interacting with the optical beam when under the influence of an electric signal and thereby result in a modulated beam. Means are provided for (i) establishing electrical contact with one or more layers of the laminate so as to enable an electrical signal to be applied across the active component and (ii) detection of the extent of modulation of the modulated beam emerging from the active component layer.

22 Claims, 21 Drawing Sheets

Schottky Diode Modulator.

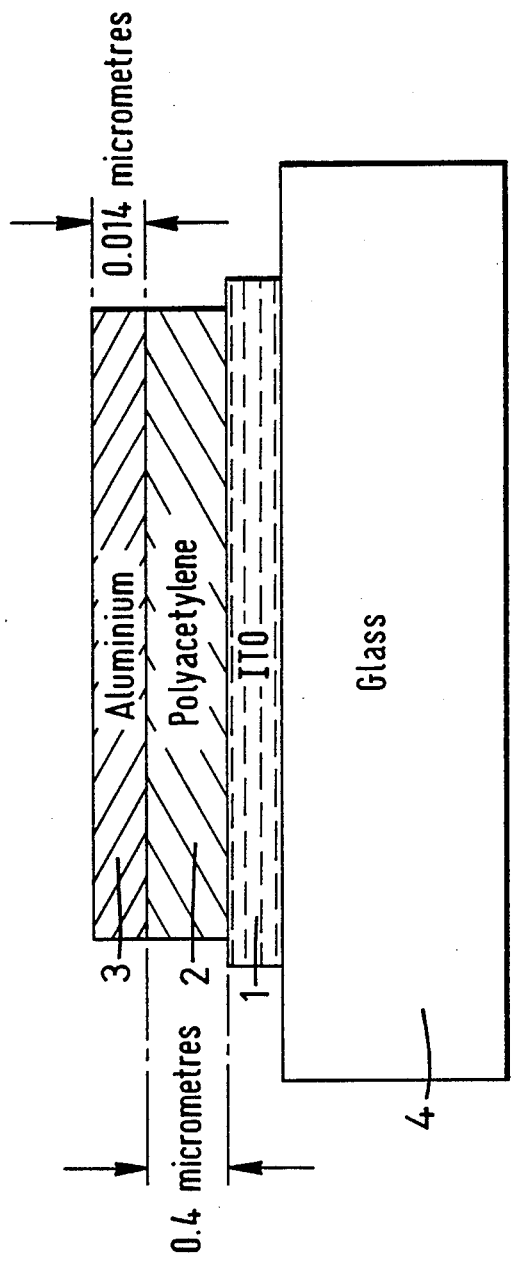
FIG. 1.1 Schottky Diode Modulator.

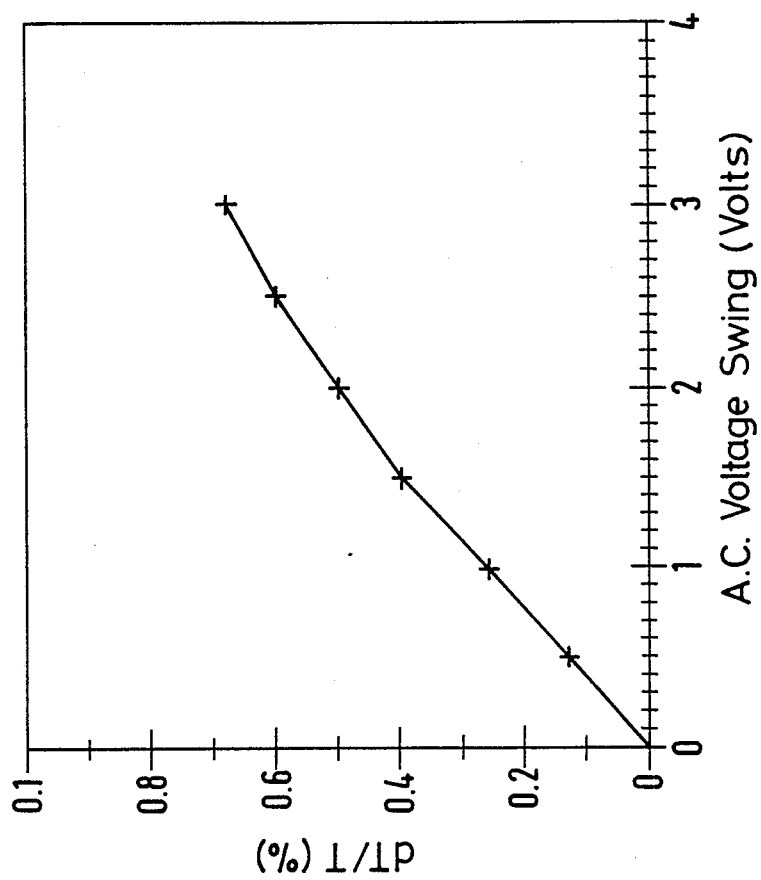
FIG.1.2  Modulation at 2000 nm - 4 Volts reverse bias.

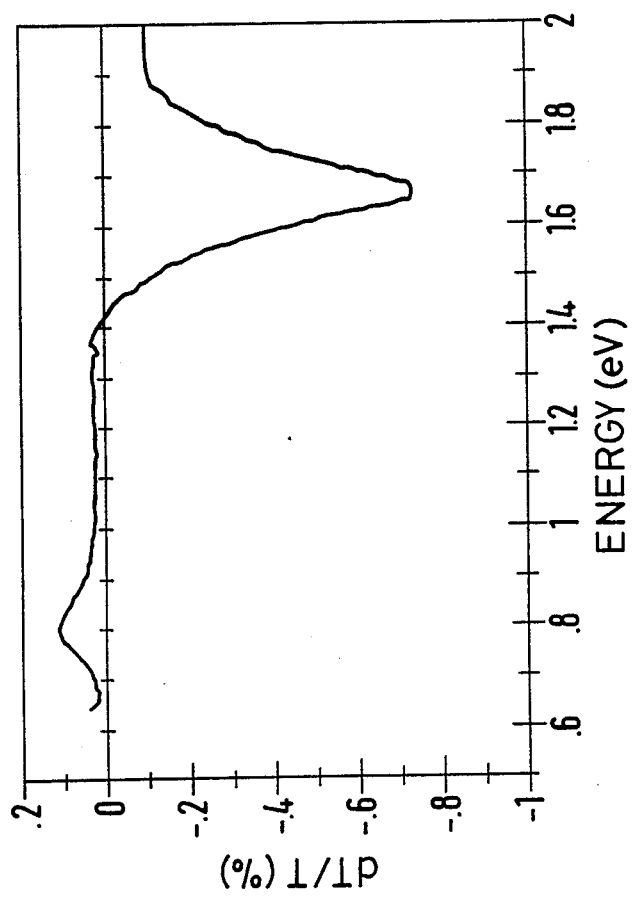
FIG.1.3 Spectral responce of modulator.

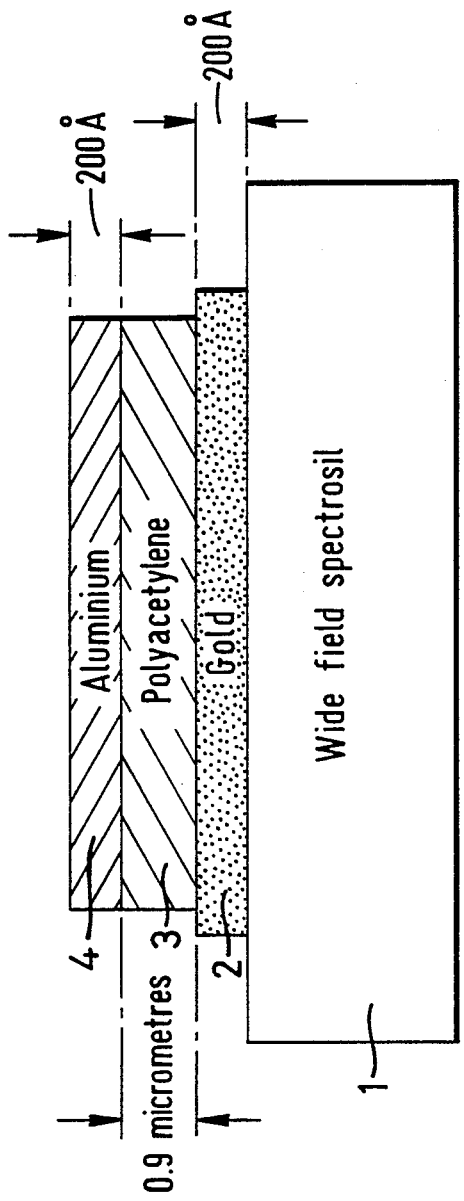
FIG. 2.1 Schottky Diode Modulator.

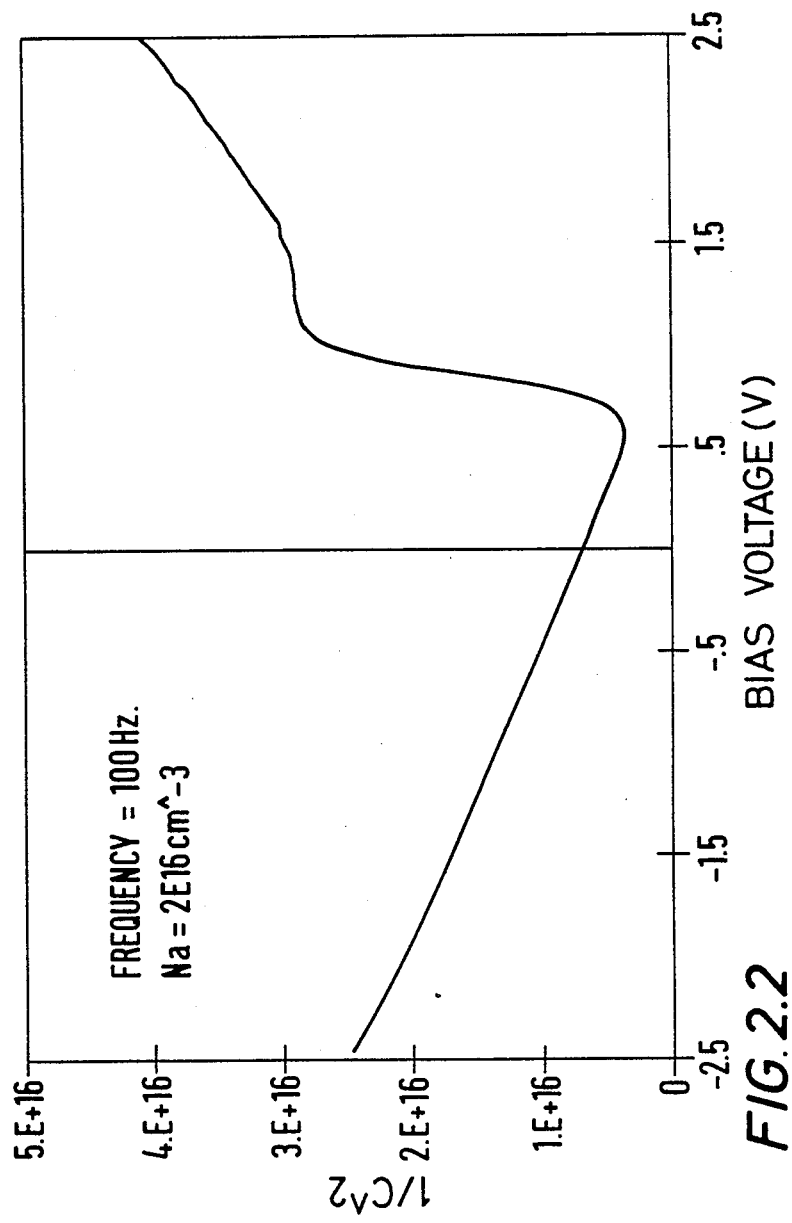
FIG. 2.2

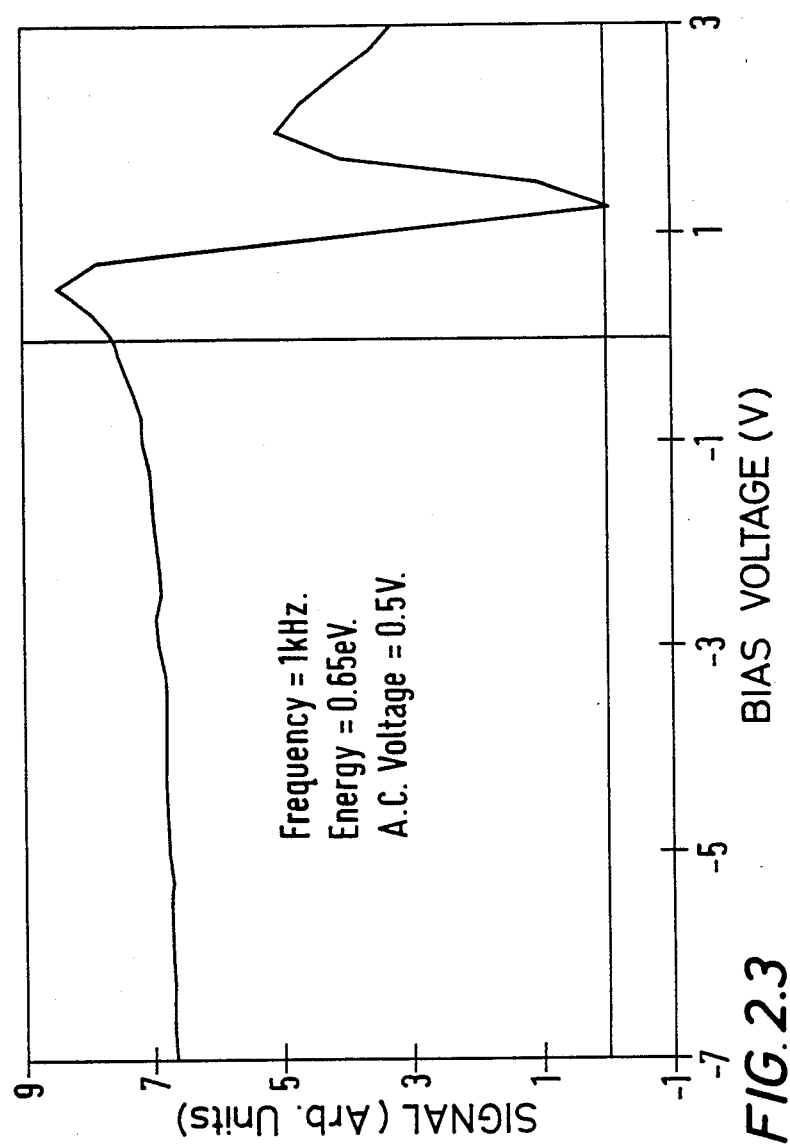
FIG. 2.3

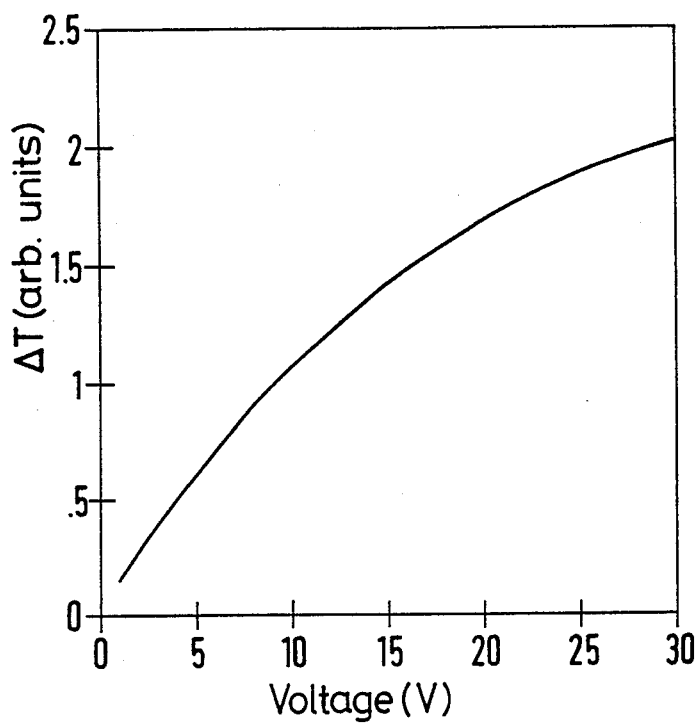
ΔT (arb. units.) –V at 0.54 eV  ΔT~$V^{0.6}$
*FIG. 2.4*

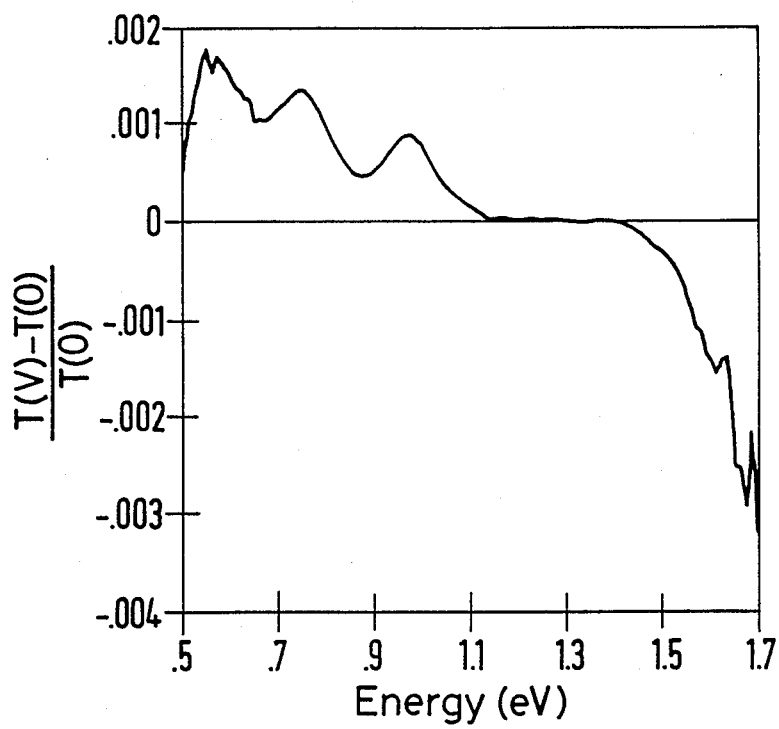
ΔT/T-V for Schottky diode between 0.5eV. and 1.7eV.
FIG. 2.5

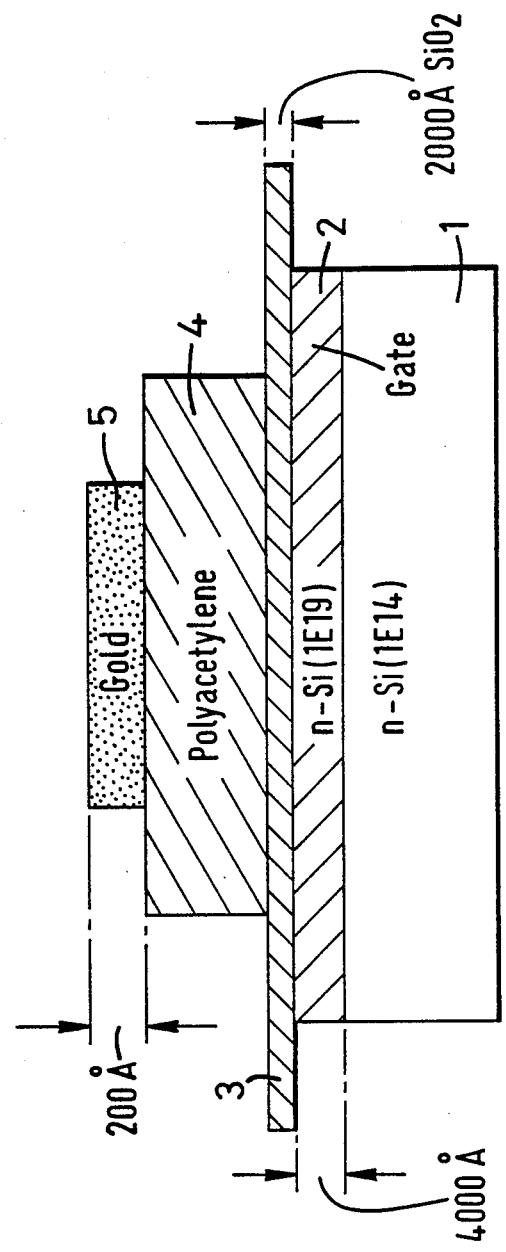
FIG. 3.1 MIS Modulator structure.

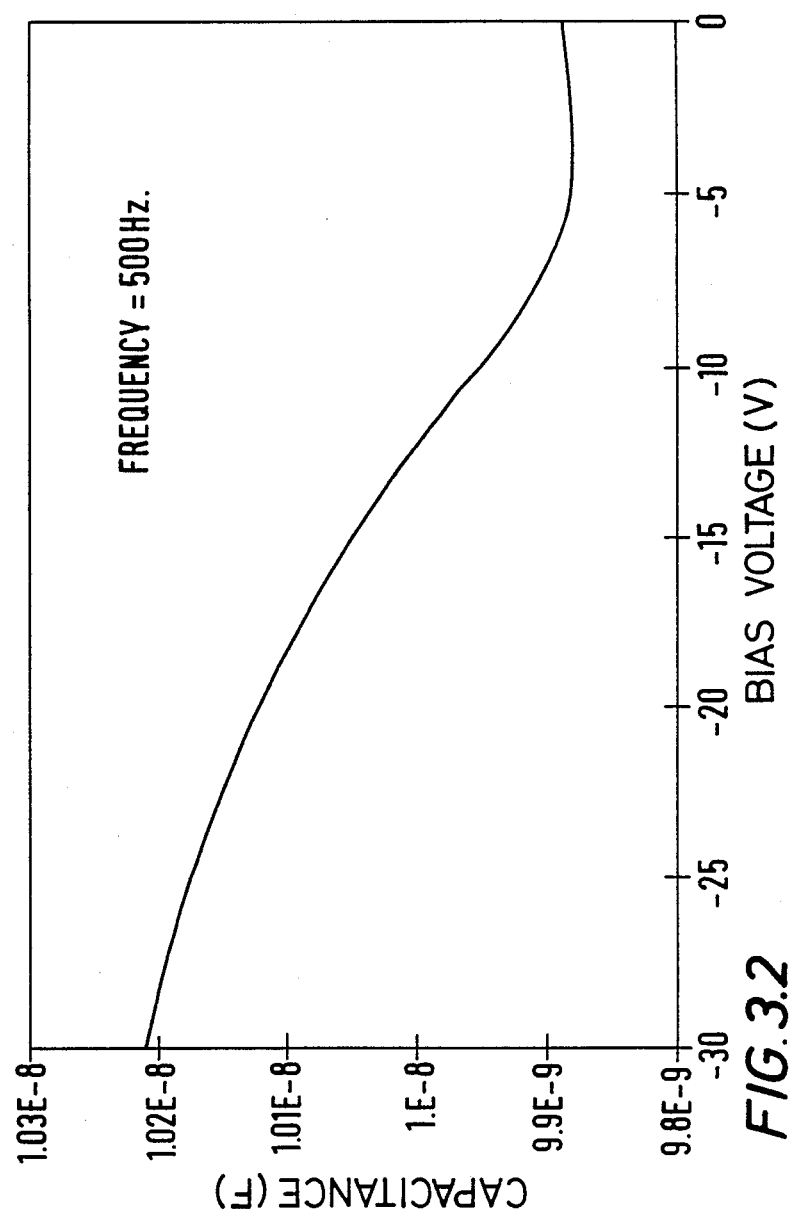
FIG. 3.2

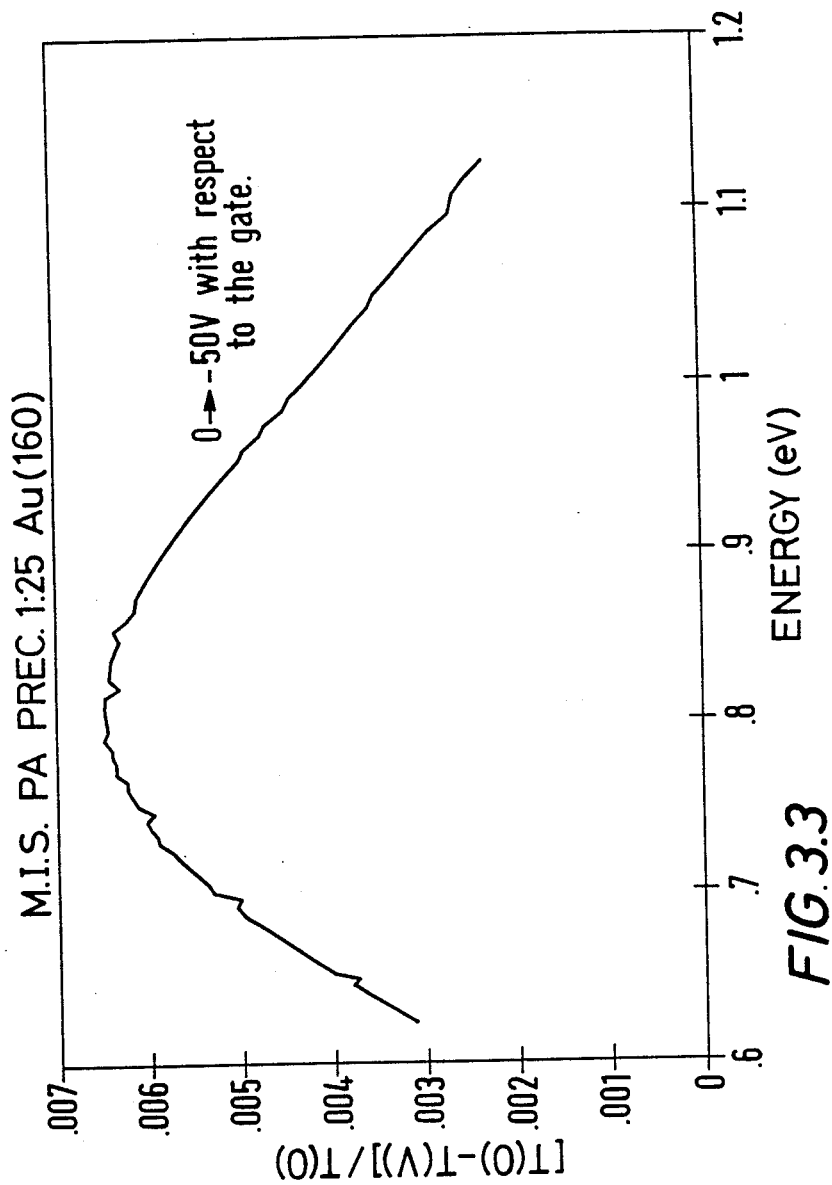
FIG. 3.3

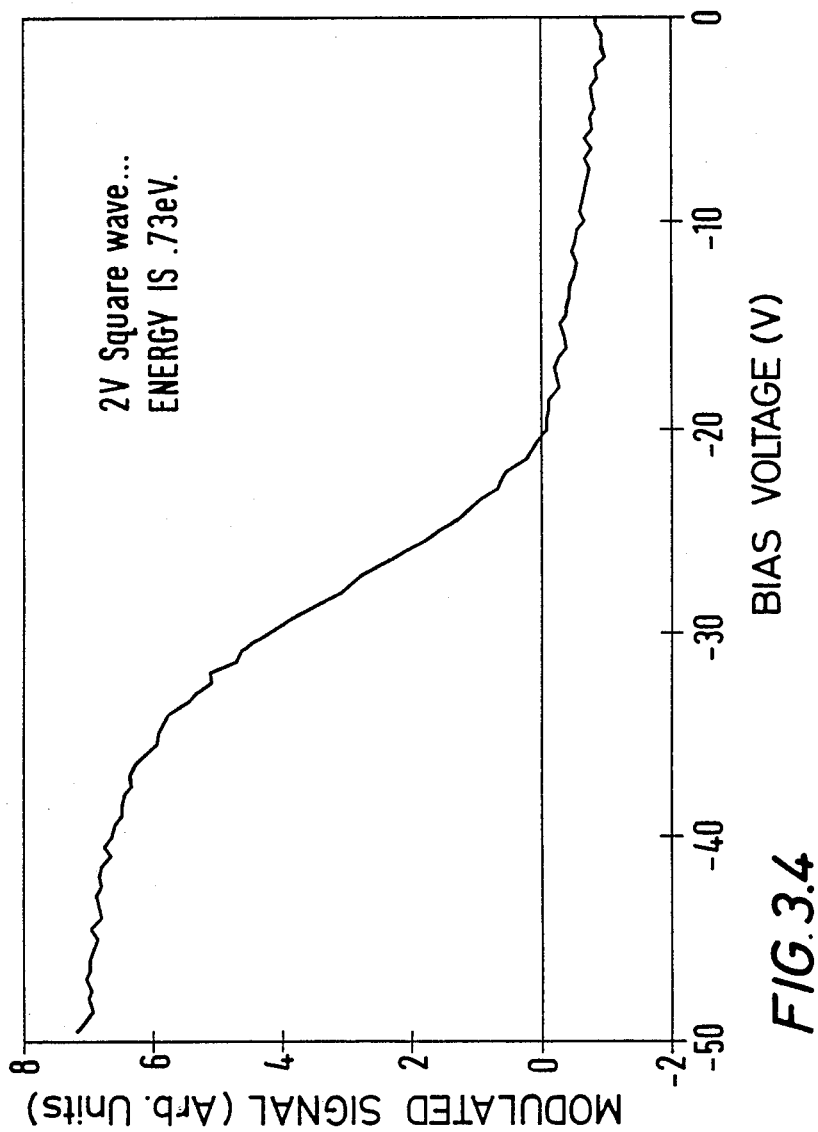
FIG.3.4

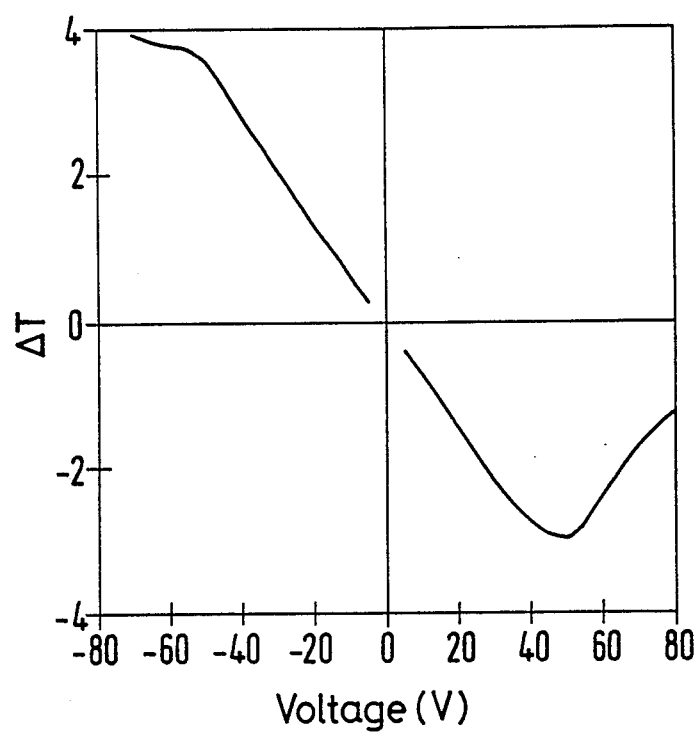
Voltage dependence of ΔT/T at 0.85eV.
FIG. 3.5

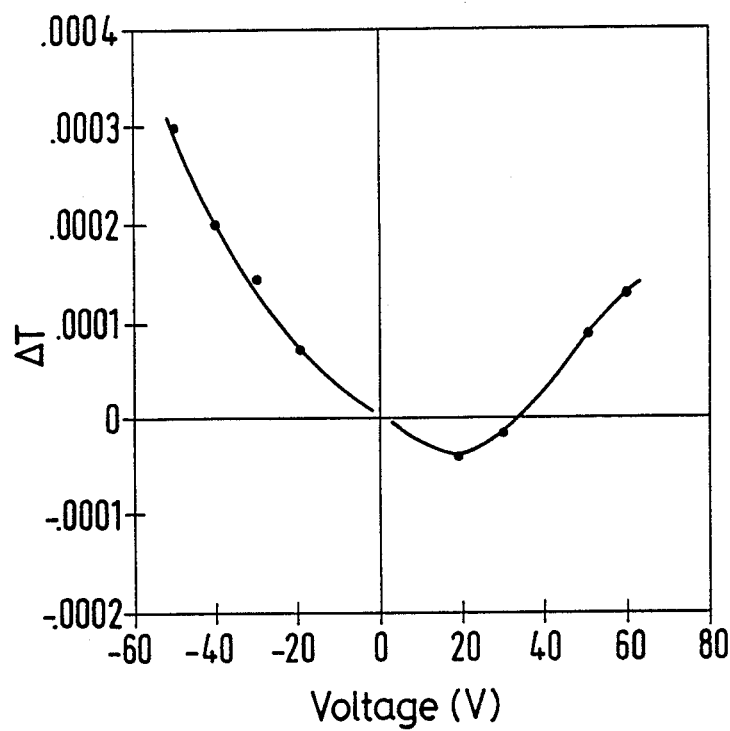
Voltage dependence of ΔT/T at 0.99eV.
*FIG. 3.6*

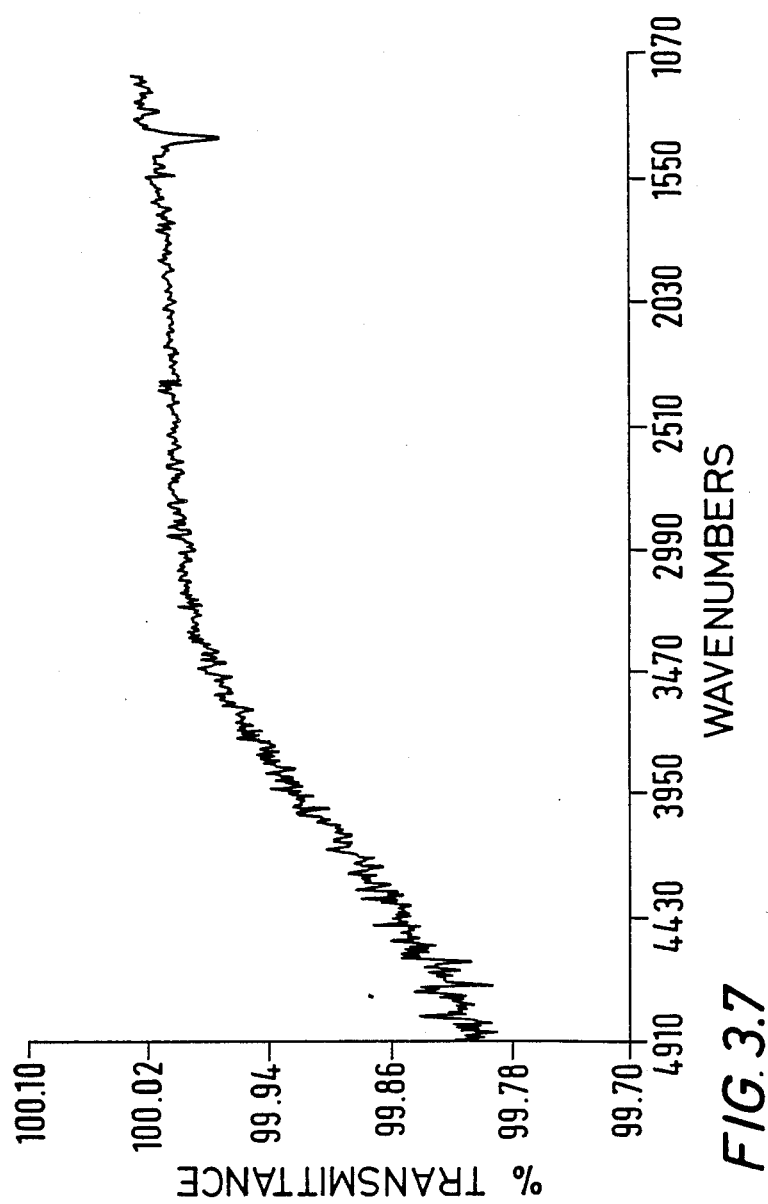
FIG. 3.7

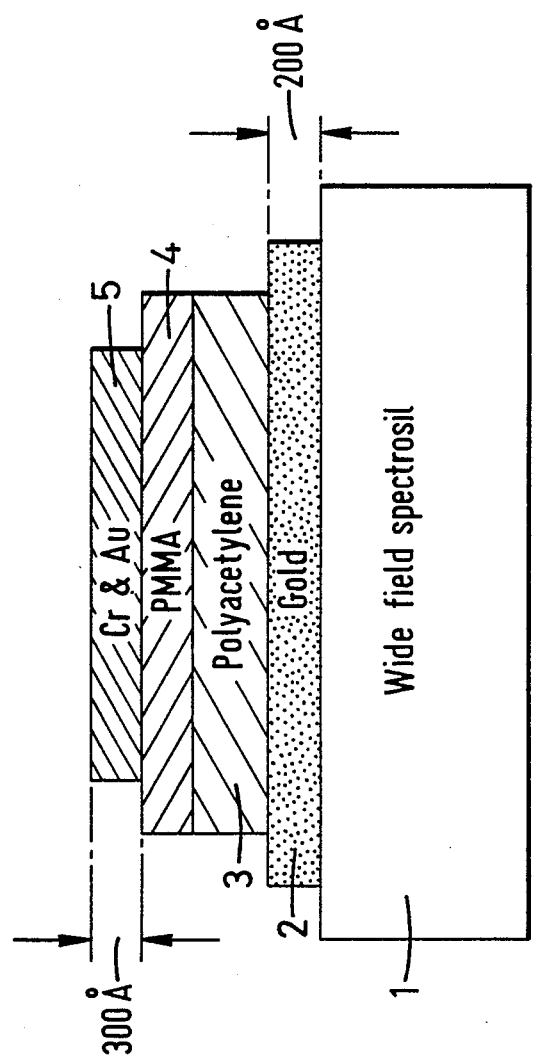
FIG. 3.8 MIS modulator using a polymer insulator.

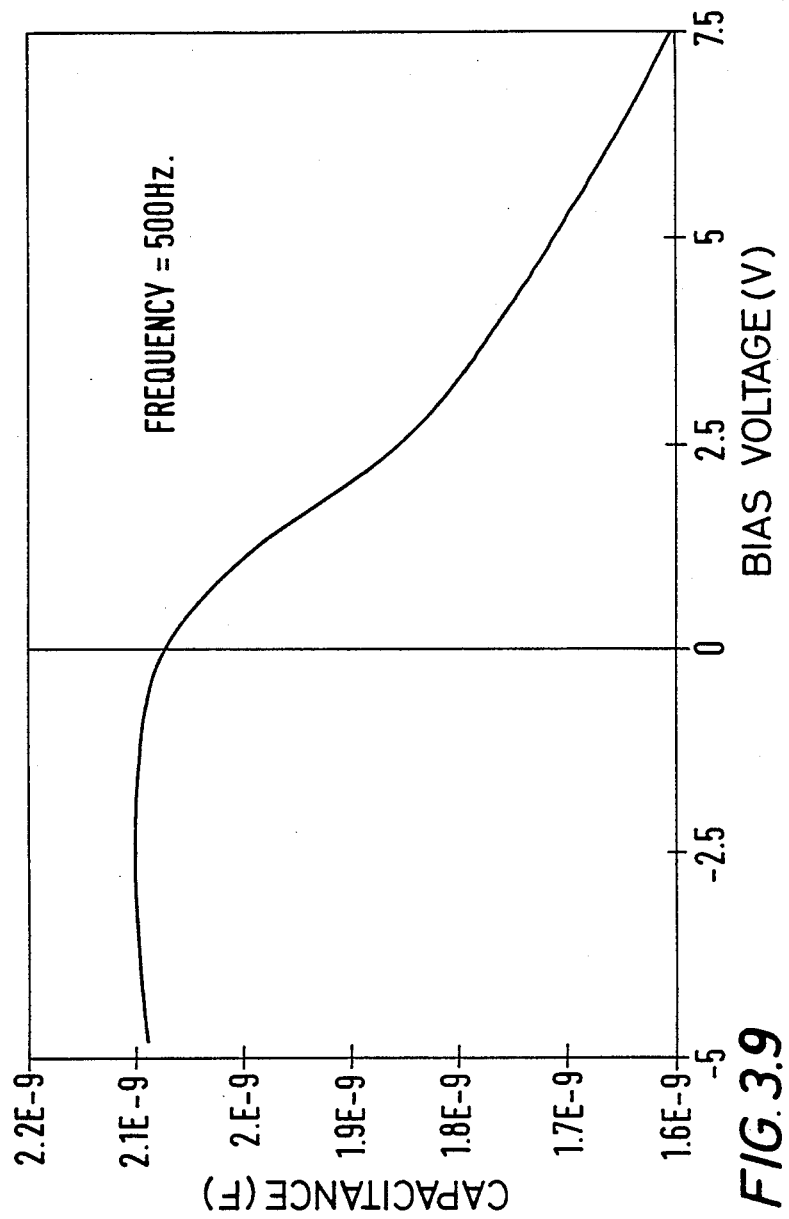
FIG. 3.9

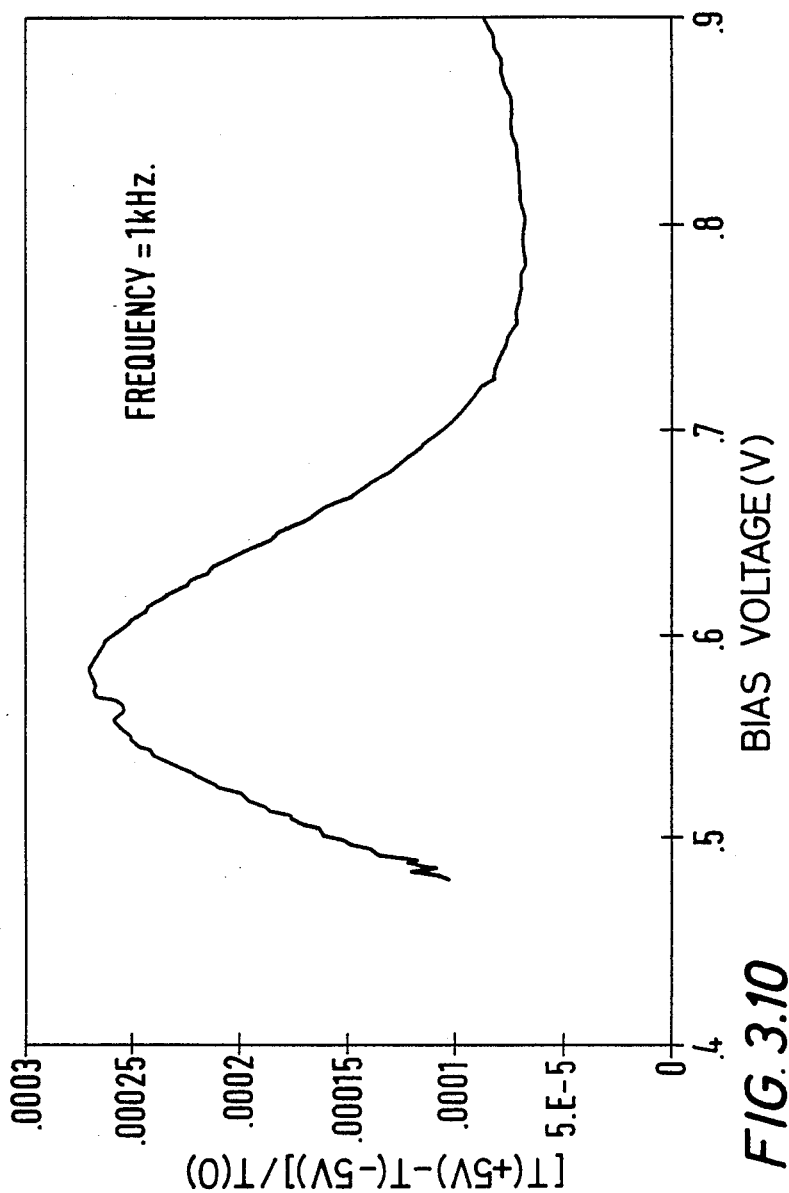
FIG. 3.10

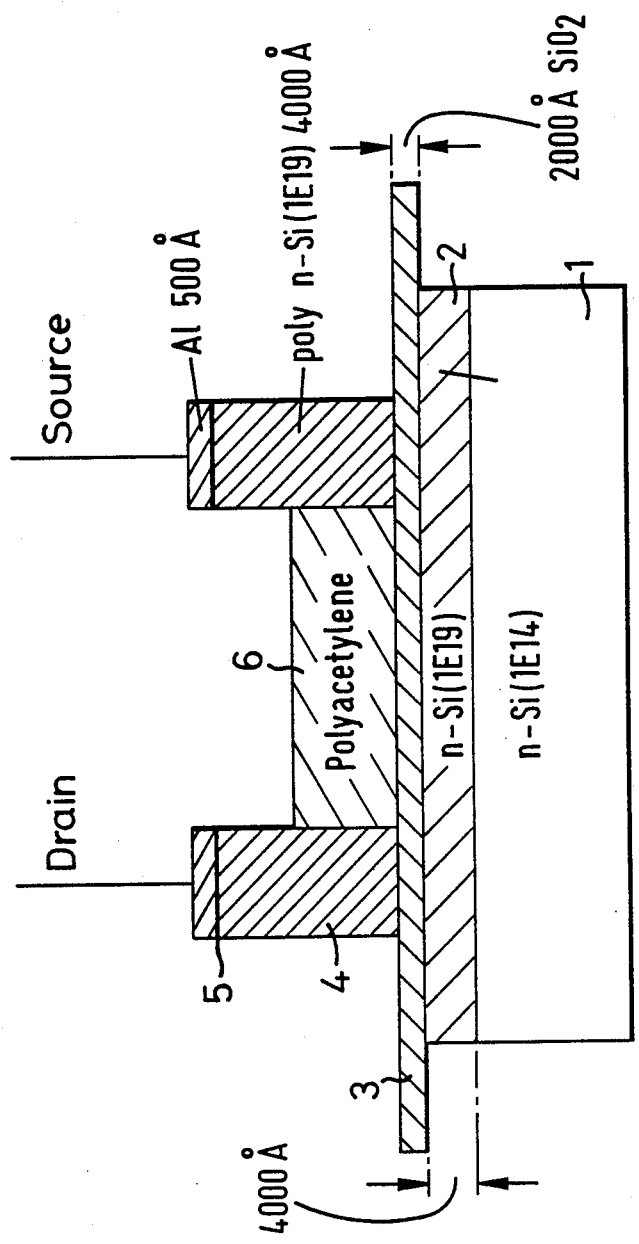
*FIG.4.1* MISFET structure.

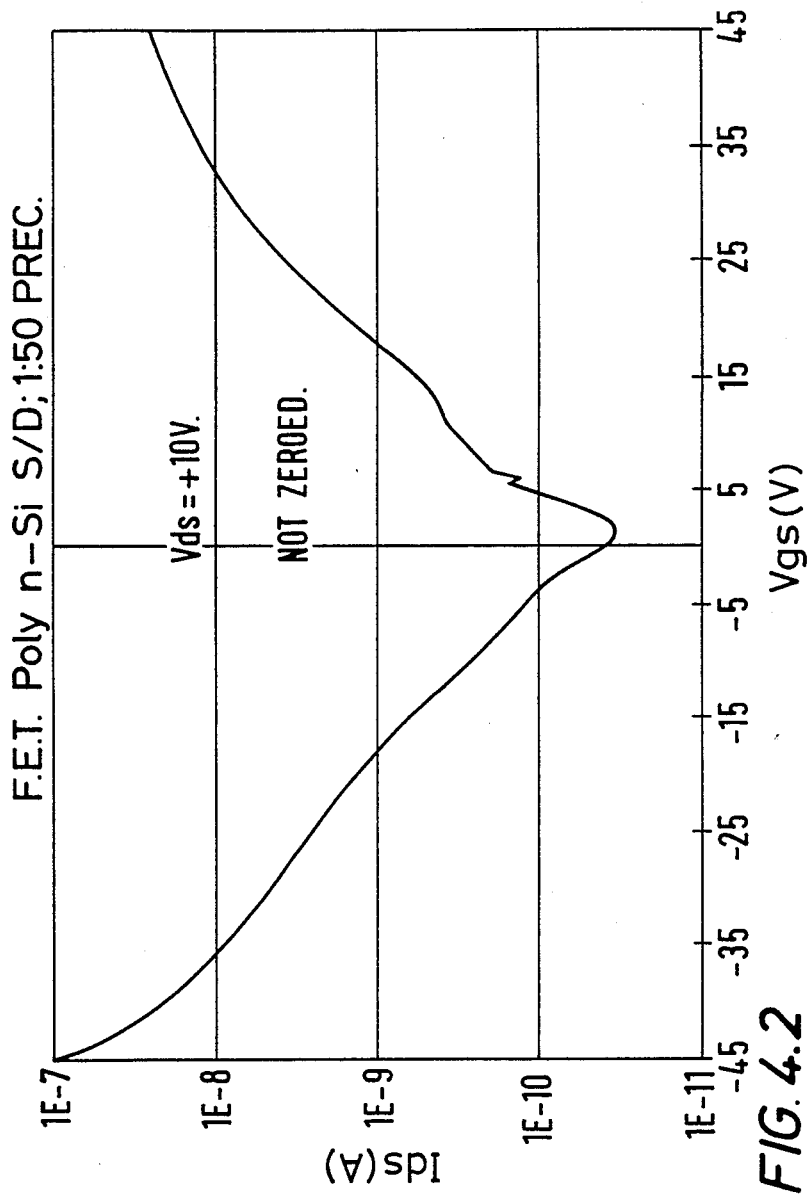
FIG. 4.2

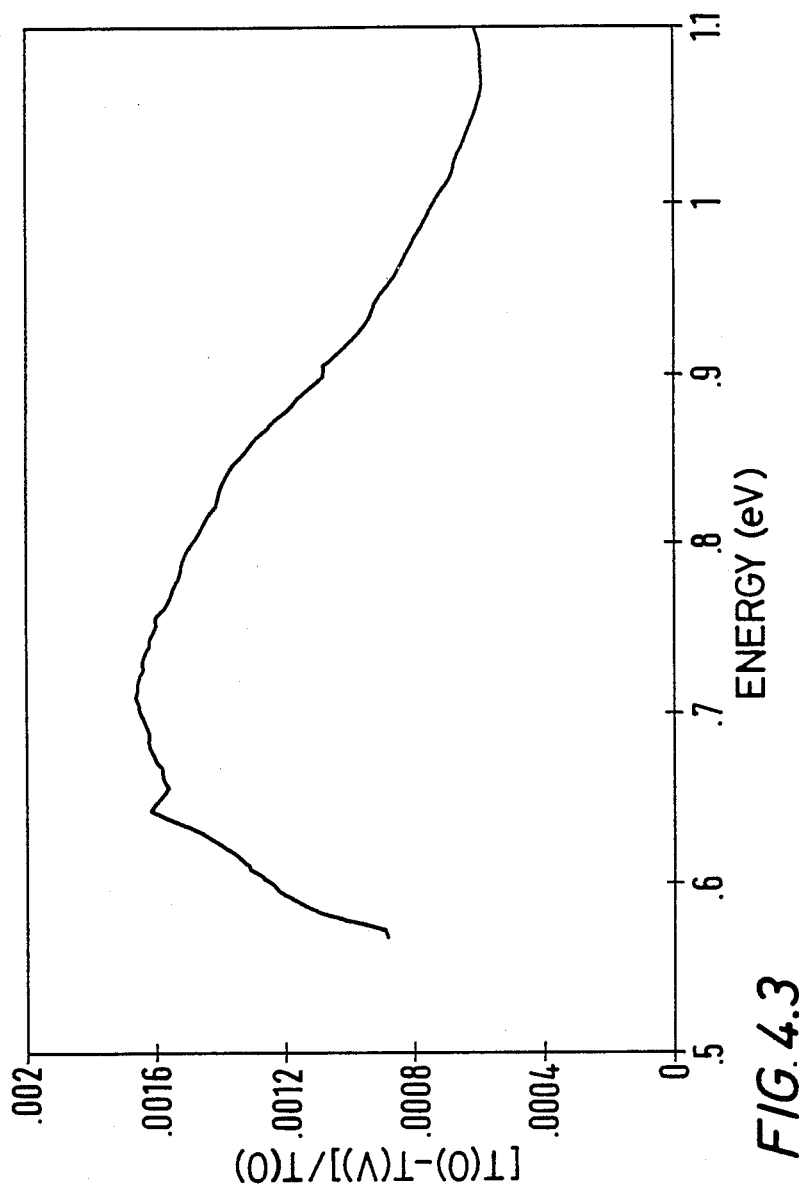
FIG. 4.3

OPTICAL MODULATORS BASED ON POLYMERS

This invention relates to the use of polymers as the active component in electro-optic modulators and to devices using the same.

By 'active' component is meant here and throughout the specification that the optical properties of the component can be modulated when under the influence of an external electrical field.

Electro-optic modulators are devices which convert an input light intensity into an output light intensity controlled by a time dependent electrical input. Modulators have an optical input window, an optical output, which may or may not be the input window, and at least two terminals for connection to the electrical modulating signal.

High frequency modulators have hitherto used inorganic materials (e.g. gallium-arsenide, lithium-niobate, gallium-aluminium-arsenide) as the active components of the device. These devices have various configurations and modes of operation but the use of inorganic materials generally means that their fabrication involves the use of complex, high cost technologies. Furthermore the inorganic materials used are not easily produced in non-planar format which places restrictions on the device configuration.

It has now been found that certain organic polymers can be used as the active components in optical modulators. These polymers are of comparatively low cost and, in some cases, have the additional advantage of being capable of production in-situ by the transformation of a processible precursor polymer.

Accordingly, the present invention is a device for electro-optic modulation of an optical beam, said device being a laminate comprising a coherent film of a conjugated polymer having semi-conducting properties as the active component laminated with two or more layers of electrically conducting, insulating or semi-conducting materials or combinations thereof, at least the active component in the laminate being capable of interacting with the optical beam when under the influence of an electric signal and thereby result in a modulated beam, means for establishing electrical contact with one or more layers of the laminate in such a manner that enables an electrical signal to be applied across the active component in the laminate and means for the detection of the extent of modulation of the modulated beam emerging from the active component.

By the expression "capable of interacting with" is meant here and throughout the specification that the incident optical beam either passes through the active component or is reflected from the surface(s) of that component.

According to a further embodiment the present invention is a process for the electrooptic modulation of an optical beam, said process comprising (a) allowing the beam to be incident upon an active component which comprises a coherent film of a conjugated polymer having semi-conducting properties and being capable of interacting with said incident beam, (b) simultaneously, during the period when the beam is incident upon the active component, applying to said active component a variable electrical signal whereby the applied signal causes the intensity of the incident beam to be modulated and emerge from the active component as a modulated beam, and (c) means for detection of the extent of modulation in the modulated beam.

By "coherent" film is meant here and throughout the specification that the film is substantially free from voids and has substantially no structural units visible under a SEM magnification of 10,000 times.

By 'conjugated polymer' is meant here and throughout the specification any polymeric structure, in which there is a formal alternation of single and double bonds.

The coherent film of the conjugated polymer having semi-conducting properties is suitably derived from poly(acetylene), polyparaphenylene, polyphenylene sulphide, polydiphenyl diphenylene vinylene, perfluoro poly(1,6 heptadiyne), polyphenylene vinylene, polythienylene vinylene or polyfuranylene vinylene. Of these, polymer films which can be derived from a film of a soluble precursor thereof or which are cast from a solution of the conjugated polymers themselves are preferable because of the greater processibility and ease of handling. Particular examples of active components represented by conjugated polymers which can be derived from their precursor polymers include poly(acetylene), polythienylene vinylene and polyfuranylene vinylene. Examples of conjugated polymers which are soluble and can be cast as films from solutions thereof include poly(diphenylene diphenyl vinylene) and poly(3-alkyl thiophenes) in which the alkyl group has at least 4 carbon atoms. Of these coherent films of poly(acetylene) are most preferred.

In the case of poly(acetylene) films these suitably have a conductivity of from $10^{-9}$ to $10^{-4}$ ohm$^{-1}$ cm$^{-1}$ and a density of around 1g/cc. Poly(acetylene) of this type and methods of producing the same are described in our EP-A-80329.

The coherent films of conjugated polymers having semi-conducting properties referred to herein may be used in devices adapted for this purpose. The variable electrical field is suitably applied in a manner such that there is a build up of surface or space charge density in the active component. Thus, for instance, the device may be a device based on a conductor-semiconductor-conductor system with conductors chosen to give at least one blocking contact with the semiconductor (i.e. a Schottky diode) or a conductor-semiconductor-insulator-conductor system (i.e. an MIS system). These types of devices may be of a sandwich type construction or an interdigitated construction and may be planar or non-planar types.

When said conjugated polymer films are used as the active component, e.g. a semiconductor, it is desirable that its conductivity falls within a range whereby the electric field is concentrated within the active region of the device, e.g. the interface layer. This value will be typically $10^{-10}$ to $10^{-2}$ ohm$^{-1}$ cm$^{-1}$. Where the conjugated polymer film used is poly(acetylene) it is suitably a film of pristine poly(acetylene) which is p-type doped when prepared for example according to our published EP-A-80329.

Thus, according to another embodiment, the present invention is a device having a laminated structure for electro-optic modulation of an optical beam comprising as the active component a coherent film of a conjugated polymer having semi-conducting properties and being capable of interacting with an optical beam sandwiched between two layers of an electrically conducting material, one layer being capable of forming an ohmic contact with and the other layer being capable of forming a rectifying contact with the active component, these layers of the device being provided with means for establishing electrical contact in a manner that enables an electrical signal to be applied across the active component.

The polymer film in the modulator is preferably pristine poly(acetylene) which is intrinsically p-type doped. The polymer film suitably has a thickness of up to 50 micrometers, e.g. from 0.01-50 micrometers, suitably from 0.03 to 50 micrometer, preferably from 0.03 to 1.0 micrometer.

The layer capable of forming ohmic contact, which is hereinafter referred to as the "ohmic layer", can be selected from materials well known in the art. For instance, this layer may be of a material which has a metal work function larger than that of a semiconductor of the p-type doped polymer and smaller than that of a semiconductor of the n-type doped polymer. Thus, for the p-type polymer the ohmic layer is suitably selected from graphite, nickel, platinum, gold or indium-tin oxide and is preferably transparent. The thickness of this ohmic layer is suitably from 0.01 to 1.0 micrometer, preferably 0.02-0.4 micrometers and more preferably from 0.03 to 0.04 micrometer. The ohmic layer can be formed on the polymer film by first depositing a layer of the indium-tin oxide (e.g. of the type supplied by Triplex as ITO glass) or gold on a glass supporting disc and then applying thereon a film of the active component, e.g. the conjugated polymer. Thereafter a layer of the rectifying contact (hereinafter referred to as the "rectifying layer") material is applied on the side of the polymer film opposite that of the ohmic layer.

The rectifying layer can also be selected from materials well known in the art. In this case, the material should have a metal work function larger than that of a semiconductor of the n-type doped polymer but smaller than that of a semiconductor of a p-type doped polymer. Examples of such materials include indium and aluminium. The rectifying layer can be a transmitting layer and is preferably of a material such as aluminium. The thickness of this rectifying layer is suitably from 0.005 to 0.05 micrometer, preferably from 0.01 to 0.03 micrometer. The ohmic layer and the rectifying layer in these regions are preferably thin enough to transmit light in the visible and infra-red regions of the spectrum.

Electrically, the modulator structure is a rectifier or diode (i.e. the device allows the passage of an electric current in one direction preferentially to that in the other direction). As the voltage on the terminals is varied the optical transmission (of the polymer layer) also varies.

According to yet another embodiment, the present invention is a device having a laminated structure for electrooptic modulation of an optical beam said device comprising a layer of electrically conducting material, an active component comprising a coherent film of the conjugated polymer having semi-conducting properties, a layer of a highly insulating material and a layer of a conducting material in that sequence, and means for establishing electrical contact with one or more of the conducting layers in the laminate which enable an electrical signal to be applied across the active component, such that when the electrical signal is applied, an optical beam incident upon the modulator is capable of interacting with the active component whether said beam is normal to or parallel to the plane of the active component.

This last named modulator is the MIS type. In this case, if the incident optical beam is normal to the active component (and hence to the modulator), all the layers have to be capable of transmitting said beam. If, on the other hand, the optical beam is parallel to the active component then at least one of (a) the active component and (b) the insulating layer should be capable of transmitting the beam.

As previously, the film of a conducting organic polymer is suitably a film of pristine poly(acetylene) which is intrinsically p-type doped. The thickness of this film is suitably from 0.01 to 50 micrometer, preferably from 0.01 to 0.03 micrometer.

The layer of electrically conducting material deposited on the polymer film is suitably a thin metallic layer. The thickness of this layer is suitably from 0.005 to 0.05 micrometer, preferably from 0.01 to 0.03 micrometer. This metallic layer is suitably of gold or chromium.

Pairs of conducting contacts, of aluminium, gold, poly n-silicon etc., arranged to give a short separation between each other can be introduced at the semiconductor/insulator interface. This may be achieved by metal evaporation onto the insulator prior to deposition of the polymer film. These contacts, hereinafter called the source and drain contacts, allow operation of this structure as a Metal/Insulator/Semiconductor Field Effect Transistor (MISFET). Also, by allowing current injection into the active semiconductor region, the source and drain contacts can influence the electro-optic behaviour of this structure.

Finally, the layer of insulating material sandwiched between the polymer film and the conducting material is a material which has a high dielectric breakdown field and a high dielectric constant. Examples of such a materials are silicon dioxide, other inorganic insulators, and polymeric insulators including spin-coated films of poly(methylmethacrylate), cis-poly(acetylene), and poly(diacetylene) films deposited as Langmuir-Blodgett films of the monomer. The thickness of this insulating layer is suitably from 0.02 to 1.00 micrometer, preferably from 0.10 to 0.15 micrometer.

One or more layers, preferably the outermost layers of the laminated structure are provided with terminals for establishing electrical contact.

Thus, electrically, the modulator made from such a laminated structure is equivalent to a capacitor, or, with the source and drain contacts present, as a MISFET. When a voltage is applied to the structure charge will appear at the conductor/insulator interface. This charge is balanced by a charge of opposite sign in the polymer film and, under appropriate conditions, at the interface between the polymeric semi-conductor and the insulator.

In the device described above, as the applied voltage is varied the amount of induced charge in the polymer film therefore varies. This variation of charge will be accompanied by changes in the optical properties of the polymer film (in the region occupied by the induced charge). Thus, if an optical beam is incident upon the polymer film, upon applying an electrical field the emergent beam is modulated with respect to the incident beam.

A feature of the present invention is that electric field induced charges injected into a polymeric semiconductor film change the optical properties of this polymer film in a reversible manner, the optical constants reverting to their previous values on removal of the field induced charge. This feature has been verified experimentally.

The surface field is applied either across the barrier region of a Schottky diode or across the insulator layer in the MIS structure. For the Schottky diode, the optical changes are due to variation in the width of the space charge region, depleted of majority charge carriers. For the MIS structure, dependent upon the sign and size of the voltage applied across the insulator, it is possible to achieve variation in the width of the space charge layer, or the formation of majority charge carriers (accumulation) or minority charge carriers (inversion) at the semiconductor/insulator interface. These three modes of operation are all shown to modulate the optical properties of the devices in which p-type poly-(acetylene) has been used as the semi-conductor.

The physical principle by which we understand the operation of these modulators is that field-induced charge present on the polymer chain brings about a rearrangement of the chain structure around the charge, and a consequent change in the electronic structure and hence optical properties. The optical properties which are modulated are due to both electronic and vibrational excitations of the polymer.

The modulation in optical properties is consistent, both in magnitude and in its spectral dependence, with current models for this class of polymeric materials. Thus poly(acetylene), with the addition of field-induced electronic charge, shows increased optical absorption in the spectral region below the semiconductor energy gap in a broad band, together with sharper features below 2000 $cm^{-1}$, and reduced absorption at or above the bandgap. This is consistent with current models for bond-alternation, or soliton defects.

For the other polymers listed above, the modulation spectrum is more complicated, with the formation of at least two absorption bands below the band gap associated with electronic excitations of the polaron-like charge defects which are modelled to be the lowest energy charged excitations of the polymer chain. In addition, absorption bands below 2000 $cm^{-1}$, and reduced absorption at or above the bandgap can be expected.

Measurements discussed below are all configured to detect changes in optical transmission, and hence principally changes in the optical absorption coefficient. However, it is well established on general physical principles that changes in absorption must be accompanied by changes in reflectivity. The analysis due to Kramers and Kronig (cf. "Introduction to Solid State Physics" by C. Kittel, Published by John Wiley & Sons (1976), 5th Edition, p. 324 et seq.) provides a quantitative relation between the two. The present invention, therefore, embraces electro-optic modulation, under the conditions discussed above, of all the optical constants of the semiconductor.

This invention is now further illustrated with reference to the following Examples and the respective accompanying drawings.

BRIEF DESCRIPTION OF THE DRAWINGS

FIG. 1.1 is an embodiment of a rectifier diode modulator according to a first embodiment of the invention;

FIGS. 1.2–1.3 are graphs plotting various characteristics of the device of FIG. 1.1;

FIG. 2.1 is an embodiment of a Schottky Diode modulator according to a second embodiment of the invention;

FIGS. 2.2–2.5 are graphs plotting various characteristics of the device of FIG. 2.1;

FIGS. 3.1 and 3.8 are embodiments of a MIS modulator structure according to a third embodiment of the invention.

FIGS. 3.2–3.7 and 3.9–3.10 are graphs plotting various characteristics of the devices of FIGS. 3.1 and 3.8 respectively.

FIG. 4.1 is an embodiment of a MISFET modulator structure according to a fourth embodiment of the invention.

FIGS. 4.2–4.3 are graphs plotting various characteristics of the device of FIG. 4.1.

EXAMPLE 1

Example of a Rectifier Diode Modulator

A device of this structure is shown in FIG. 1.1. A layer (1) of transparent, electrically conducting indium-tin oxide (ITO) is formed on the surface of a glass supporting disc (4). A film of a poly(acetylene) precursor polymer is applied on top of the ITO layer and then heated under vacuum to 100° C. for 200 minutes. The film is thus transformed into a film (2) of fully dense, coherent, pristine polyacetylene which is 0.4 micrometers thick. The structure is transferred to a vacuum evaporator (involving a short exposure to air) and a layer (3) of aluminium 0.014 micrometers thick is deposited on top of a region of the polyacetylene film. This region of the structure is the optical modulator diode.

The structure is finally encapsulated under a glass disc which is bonded with a film of "Loctite 350" ultraviolet curing adhesive.

The modulator diode was characterised using standard capacitance-voltage (C-V) and current-voltage techniques and was found to behave as a Schottky diode. The data obtained from the C-V measurement was used to plot $1/C^2$ against V and hence obtain a value for the charge concentration, $N_A$ within the polymer. This plot gave a value of $N_A = 9 \times 10^{16}$ $cm^{-3}$.

Monochromatic light in the range 0.6 to 2.6 micrometers was passed through the modulator diode and the transmitted light was monitored using photosensitive detectors. Voltages were applied to the aluminium layer of the modulator and the ITO layer of the modulator was earthed.

The modulator was characterised as follows:

Voltage Response

An offset of +4 volts (DC) was applied to the aluminium layer to reverse bias the junction. An alternating current (AC) voltage swing was superimposed on this offset. Light of 2000 nm wavelength was passed through the modulator diode and into the detector. The following results were obtained when the AC component was at a frequency of 360 Hz:

| a.c. peak to peak swing (volts) | Detector output (at AC frequency) |
| --- | --- |
| 3.0 | 2.60 (0.3 mV ranges) |
| 2.5 | 2.30 (0.3 mV ranges) |
| 2.0 | 1.92 (0.3 mV ranges) |
| 1.5 | 1.54 (0.3 mV ranges) |
| 1.0 | 1.00 (0.3 mV ranges) |
| 0.5 | 0.49 (0.3 mV ranges) |
| 0.5 | 1.78 (0.1 mV ranges) |
| 0.4 | 1.44 (0.1 mV ranges) |
| 0.3 | 1.10 (0.1 mV ranges) |
| 0.2 | 0.70 (0.1 mV ranges) | and to show the measurement noise level -

-continued

| a.c. peak to peak swing (volts) | Detector output (at AC frequency) |
|---|---|
| 0.0 | + or − 0.05 (0.1 mV ranges) |

The level of light showing no modulation corresponded to a detector output of 3.55 (1.0 V range).

The ratio of alternating current (AC) detector output to the mean direct current (DC) output level gives the modulation of the transmitted light. The results above have been transformed into a plot of modulation vs alternating current voltage which is shown in FIG. 1.2.

Spectral Response

A periodic square wave of frequency 1 KHz and amplitude of 12 volts peak-to-peak ($V_{pp}$) with a DC offset of 6 volts were applied to the aluminium contact of the modulator. A modulation depth of up to 1.0% was measured in the wavelength region of 0.6 to 2.0 micrometers. The modulation was found to be wavelength dependent and is shown in FIG. 1.3.

Frequency Response

A periodic square wave of amplitude 12 $V_{pp}$ with a DC offset of 6 volts was again applied to the aluminium contact of the modulator and the frequency of oscillation was varied. Monochromatic light of wavelength 0.75 micrometer was passed through the modulator. Modulation of transmitted light was observed for all frequencies up to the limit of the measuring system, i.e. 1 MHz.

EXAMPLE 2

Schottky Diodes

A device of this structure is shown in FIG. 2.1. A layer of gold, of thickness 200 Å, was evaporated onto a wide-field spectrosil substrate. This is used as the transparent ohmic contact with poly(acetylene). Poly(acetylene) precursor in solution was spin-coated onto the disc at 2000 r.p.m. The precursor was then heated under a vacuum to 100° C. for 600 minutes. The poly(acetylene) film thus formed was 0.9 micrometers in thickness. The structure was transferred to an evaporator (involving a 30 second exposure to air) and pumped to a pressure of $1 \times 10^{-5}$ mbar for 120 minutes before evaporating the top, blocking, contact of aluminium. The aluminium thickness was 0.02 micrometers. The structure was finally transferred to a cryostat and kept at a pressure of less than $2 \times 10^{-6}$ mbar.

Electrical measurements of these structures show them to behave as Schottky diodes. With the voltage applied in the forward direction (gold positive with respect to the aluminium) currents were typically $10^5$ times larger than with the polarity of the voltage reversed. Typical results for the variation of the device capacitance as a function of bias voltage are shown in FIG. 2.2. Using the standard analysis for the variation of the thickness of the depletion region with bias voltage, a value for the concentration of p-type dopants of about $2 \times 10^{16}$ cm$^{-3}$ is obtained.

Monochromatic light with photon energies in the range 0.5 to 1.7 electron volts (eV) was passed through the device and the transmitted light was monitored using photosensitive detectors.

An alternating voltage, switching between zero and a fixed positive voltage (the aluminium contact positive with respect to the gold contact) was applied across the structure, and the component of the light transmitted through the device modulated at the same frequency and phase as the bias was measured. FIG. 2.3 shows the dependence with DC bias voltage of the modulated transmission signal for a 0.5 V square wave of frequency 1 kHz superposed on the DC level at 0.65 eV. FIG. 2.4 shows the voltage dependence of the modulation signal for light of 0.54 eV and modulation frequency 333 Hz. FIG. 2.5 shows the spectral dependence of the modulation signal for a modulation frequency of 500 Hz, in the range 0.5 to 1.7 eV. The peak in the below band-gap modulation is found at 0.55 eV.

EXAMPLE 3

MIS Structures (a) FIG. 3.1 shows the metal/insulator/semiconductor (MIS) structure used in this Example. The starting substrate (1) is an ultra-pure silicon wafer, polished on both sides. On one side the silicon was heavily n-type doped ($1 \times 10^{19}$ cm$^{-3}$) to a depth of 0.4 micrometers (2). The doping was achieved by diffusion of phosphorus atoms into the substrate and then annealing the substrate at 900° C. A silicon dioxide layer (3) of width 0.2 micrometers was produced on the doped surface by the thermal oxidation of the silicon.

Poly(acetylene) precursor was then spin-coated onto the silicon dioxide layer at a spin speed of 2000 r.p.m. (4). The precursor film was then thermally transformed to poly(acetylene) by heating to 100° C. for 1080 minutes within a vacuum chamber which was dynamically pumped. The fully transformed poly(acetylene) film (4) was 0.002 micrometers thick.

A layer of gold (5), 0.02 micrometers thick was then deposited (by vacuum exporation) onto the poly(acetylene) film (4). This layer of metal provided electrical contact to the poly(acetylene) film (4), whilst allowing transmission of light through it.

Gold wires 65 micrometers in diameter were bonded to the n-type silicon (2) and the gold layer using colloidal silver paint to provide electrical contact to the structure. The performance of the device was measured using capacitance-voltage and complex impedance techniques to show that it behaved as an MIS structure in which accumulation or depletion layers of charge are formed in the polymeric semiconductor, depending on the voltage across the device. FIG. 3.2 shows the variation of the capacitance as a function of voltage across the device at 500 Hz.

The transmission characteristics of the silicon substrates sets a short wavelength limit of 1.1 micrometers. Using an indium-antimony (InSb) detector the wavelength range was therefore between 1.1 and 2.6 micrometers. The change in output of the detector was measured as a function of the voltage applied between the two terminals of the modulator.

An alternating voltage, switching between zero and a fixed voltage, was applied across the structure, and the component of the light transmitted through the device which was modulated at the same frequency and phase as the bias was measured. FIG. 3.3. shows the spectral dependence of the modulation signal between 0.6 and 1.2 eV. The applied voltage was switched between 0 and −50 volts (silicon negative with respect to the gold) at a frequency of 333 Hz. The peak in the modulated transmission spectrum was 0.64% for light with energy of 0.8 eV. FIG. 3.4 shows the dependence with DC bias voltage of the modulated transmission signal for a 2 V square wave of frequency 7 kHz superposed on the DC level. The signal obtained when switching between zero volts and a given bias voltage is shown as a function of the bias voltage for photon energies of 0.99 and 0.85 eV in FIGS. 3.5 and 3.6.

The frequency dependence of the electro-optic modulation was followed up to 10 kHz which was the cut-off of the measurement system. Electro-optic modulation was seen at all frequencies.

(b) Infrared modulated transmission experiments, using a Fourier Transform Infrared spectrometer, have been performed on MIS structures prepared under the same conditions as those in 3(a) above. In these experiments a positive voltage was periodically applied to the gold contact with the n-type silicon contact earthed. Spectra were taken with the voltage alternately on and off. The ratio of the two spectra was then calculated numerically in order to observe changes in absorption due to the applied electric field. FIG. 3.7 shows a spectrum for an MIS structure with an applied bias of +50 V, obtained by averaging a total of 128000 scans.

(c) FIG. 3.8 shows the structure of a MIS device using a polymer as the insulator layer. The substrate (1) (wide-field spectrosil) was coated with 0.02 micrometers of gold (2) by evaporation. Poly(acetylene) precursor was then spin-coated (3) onto the substrate at 2000 r.p.m. The precursor concentration was 1 gram of dried precursor polymer to 13 ml of 2-butanone. The poly(acetylene) was transformed under the same conditions as the previous MIS devices. Four layers of poly(methylmethacrylate) (PMMA) solution (4) (one gram of PMMA to 100 ml of dichloromethane) were then spin-coated onto the fully transformed poly(acetylene) film at 2000 r.p.m. The top contact was 0.02 micrometers of chronium and 0.01 micrometers of gold; both metals were evaporated onto the sample.

FIG. 3.9 shows a capacitance-voltage plot at 500 Hz for this device. The modulated transmission spectrum was measured between 0.4 and 0.9 eV for ±5 V 1 kHz square wave, and is shown in FIG. 3.10.

EXAMPLE 4

FIG. 4.1 shows the Metal-Oxide-Semiconductor Field Effect Transistor (MISFET) structure used in this example. The substrate (1) is an ultra-pure silicon wafer, polished on both sides. On one side only, the silicon was heavily n-type doped ($1 \times 10^{19}$ cm$^{-3}$) to a depth of 0.4 micrometers (2). The doping was achieved by diffusion of phosphorus atoms into the substrate and then annealing the substrate at 900° C. On this doped surface a silicon dioxide layer (3) of width 0.2 micrometers was produced by thermal oxidation of the silicon surface. Using standard electron beam lithography techniques, interdigitated source and drain contacts of heavily n-type doped ($>1 \times 10^{19}$ cm$^{-3}$) poly-silicon, capped with 0.05 micrometers of aluminium (4) were deposited onto the silicon dioxide layer (3). The channel length for this structure is 20 micrometers, and the channel width is 1.5 meters. A poly(acetylene) film was formed on top, using conditions similar to those specified in Example 3 above (solution concentration for spin-coating was 1 gram precursor polymer to 50 milliliters 2-butanone).

Using the silicon substrate as the gate, and the two interdigitated poly n-silicon/aluminium contacts as source and drain, the device showed characteristic MISFET behaviour. FIG. 4.2 shows the variation of the source drain current with gate voltage with a constant source to drain voltage of 10 volts.

Optical transmission measurements were carried out by passing the light beam through the space between the interdigitated contacts, which were held at the same potential with respect to the gate. FIG. 4.3 shows the modulation spectrum between 0.5 and 1.1 eV, obtained when switching the gate voltage between 0 and −50 V at 333 Hz.

We claim:

1. A device for electrooptic modulation of an optical beam, said device being a laminate comprising a coherent film of a conjugated polymer having semi-conducting properties as the active component laminated with two or more layers of electrically conducting, insulating or semi-conducting materials or combinations thereof, at least the active component in the laminate being capable of interacting with the optical beam when under the influence of an electric signal and thereby result in a modulated beam, means for establishing electrical contact with one or more layers of the laminate in such a manner that enables an electrical signal to be applied across the active component in the laminate and means for detection of the extent of modulation of the modulated beam energing from the active component layer.

2. A device for electrooptic modulation of an optical beam according to claim 1 wherein the active component is sandwiched between two layers of an electrically conducting material, one layer being capable of forming an ohmic contact with and the other layer being capable of forming a rectifying contact with the active component, these layers of the device being provided with means for establishing electrical contact in a manner that enables an electrical signal to be applied across the active component.

3. A device for electrooptic modulation of an optical beam according to claim 1 wherein said laminate comprises in a sequence a layer of electrically conducting material, an active component, a layer of highly insulating material and a layer of electrically conducting material.

4. A device according to claim 1 wherein the conductivity of the active component is within the range of $10^{-10}$ to $10^{-2}$ ohm$^{-1}$ cm$^{-1}$.

5. A device according to claim 1 wherein the coherent film of a conjugated polymer having semi-conducting properties is that of a polymer selected from poly(acetylene), polyparaphenylene, polyphenylene sulphide, polydiphenyl diphenylene vinylene, perfluoro poly(1,6 heptadiyne), polyphenylene vinylene, polythienylene vinylene or polyfuranylene vinylene.

6. A device according to claim 1 wherein the coherent film of a conjugated polymer is that of poly(acetylene) having a conductivity of from $10^{-9}$ to $10^{-4}$ ohm$^{-1}$ cm$^{-1}$ and a density of about 1 g/cc.

7. A device according to claim 1 wherein the active component has a thickness of up to 50 micrometers.

8. A device according to claim 1 wherein the active component is a coherent film of an intrinsically p-type doped poly(acetylene).

9. A device according to claim 2 wherein the ohmic layer is of a material which has a metal work function larger than that of a semi-conductor of p-type doped polymer and smaller than that of a semi-conductor of an n-type polymer.

10. A device according to claim 9 wherein the ohmic layer is of a material selected from graphite, nickel, platinum, gold or indium-tin oxide.

11. A device according to claim 9 wherein the thickness of the ohmic layer is from 0.01 to 1.0 micrometer.

12. A device according to claim 2 wherein the rectifying layer is that of a material having a metal work function larger than that of a semi-conductor of an n-type doped polymer but smaller than that of a semiconductor of a p-type doped polymer.

13. A device according to claim 12 wherein the rectifying layer is that of indium or aluminium.

14. A device according to claim 12 wherein the thickness of the rectifying layer is from 0.005 to 0.05 micrometer.

15. A device according to claim 3 wherein the layers of electrically conducting material are metallic layers each having a thickness of 0.005 to 0.05 micrometer.

16. A device according to claim 15 wherein the metallic layers are at least one of gold or chromium.

17. A device according to claim 3 wherein pairs of conducting contacts selected from aluminium, gold and poly-n-silicon are arranged to give a short separation between each other and are introduced at the interface between the active component which is the semi-conductor and the insulating layer.

18. A device according to claim 3 wherein the insulating layer sandwiched between the active component, which is a polymer film, and the layer of conducting material is that of a material having a high dielectric breakdown field and a high dielectric constant.

19. A device according to claim 18 wherein the insulating layer is of a material selected from silicon dioxide, other inorganic insulators and polymeric insulators.

20. A device according to claim 18 wherein the insulating layer is a spin coated film of poly(methyl methacrylate), cis-poly(acetylene), or poly(diacetylene) films deposited as Langmuir Blodgett films of the monomer.

21. A device according to claim 3 wherein the thickness of the insulating layer is from 0.02 to 1.00 micrometer.

22. A process for the electrooptic modulation of an optical beam, said process comprising
  (a) allowing the beam to be incident upon an active component which comprises a coherent film of a conjugated polymer having semiconducting properties and being capable of interacting with said incident beam when under the influence of an electric signal,
  (b) simultaneously, during the period when the beam is incident upon the active component, applying to said active component a variable electrical signal whereby the applied signal causes the intensity of the incident beam to be modulated and emerge from the active component as a modulated beam, and
  (c) means for detection of the extent of modulation in the modulated beam.

* * * * *

UNITED STATES PATENT AND TRADEMARK OFFICE
CERTIFICATE OF CORRECTION

PATENT NO.  : 4,923,288
DATED       : May 8, 1990
INVENTOR(S) : P. C. Allen et al.

It is certified that error appears in the above-identified patent and that said Letters Patent is hereby corrected as shown below:

Column 10, line 65, "n-type polymer" should be -- n-type doped polymer --.

Signed and Sealed this

Eleventh Day of June, 1991

Attest:

HARRY F. MANBECK, JR.

Attesting Officer        Commissioner of Patents and Trademarks